May 22, 1934.  J. M. GRAHAM  1,959,580
MUSCULO-TONE METER
Filed Sept. 1, 1931

Inventor
James M. Graham
By Shrev, Crow & Gordon
Attorneys

Patented May 22, 1934

1,959,580

UNITED STATES PATENT OFFICE 1,959,580

MUSCULO-TONE METER

James M. Graham, National Military Home, Ohio

Application September 1, 1931, Serial No. 560,625

1 Claim. (Cl. 33—179)

Generically this invention relates to measuring devices, but more especially it is directed to the type of device adapted to measure and indicate the functional and organic muscular condition of a person.

One of the principal objects of this invention is the provision of a device adapted to indicate the functional and organic muscular condition and measure fluctuations of contractility, thereby indicating what may be termed the muscle tone, and I have therefore designated my device a musculo-tone meter.

A further important object of this invention is the provision of a device of this character adapted to be applied, for instance, to the forearm to measure the slightest fluctuation in the contractility of the muscles, thereby indicating the condition of the muscle, or muscle-tone, and likewise adapted to indicate the presence of a musculo-rheumatic condition found associated with several diseases in varying degrees of involvement, such as pulmonary tuberculosis, Raynaud's disease, progressive muscular atrophy, syphilis, tertiary and perenchymatous nephritis, old age, and certain nervous and mental conditions.

Another object of this invention is the provision of a device of this character mounted in a suitable case, having an indicating hand and gear mechanism associated therewith, a strap member adapted to encircle the arm of a person, having one end connected to said gear mechanism and the other end fixedly secured exteriorly of the case, whereby the slightest variation in the functional and organic condition of the muscle is indicated on said dial.

With these and other objects in view, which will become apparent as the description proceeds, the invention resides in the construction, combination and arrangement of parts, hereinafter more fully described and claimed, and illustrated in the accompanying drawing, in which like characters of reference indicate like parts throughout the several figures, of which:

Figure 1:
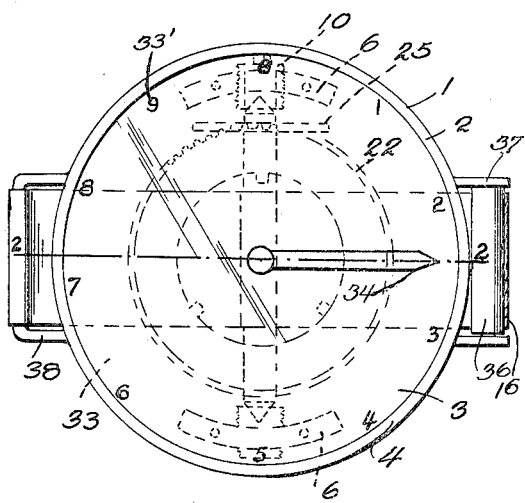
Fig. 1 is a top plan view of my improved measuring device.
Figure 3:
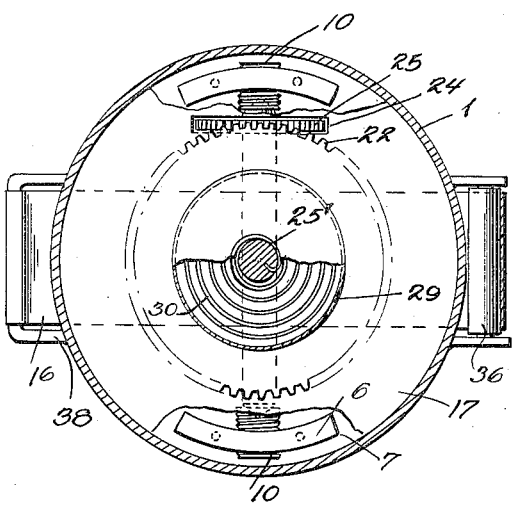
Fig. 3 is a horizontal section taken on the line 3—3 of Fig. 2.
Figure 2:
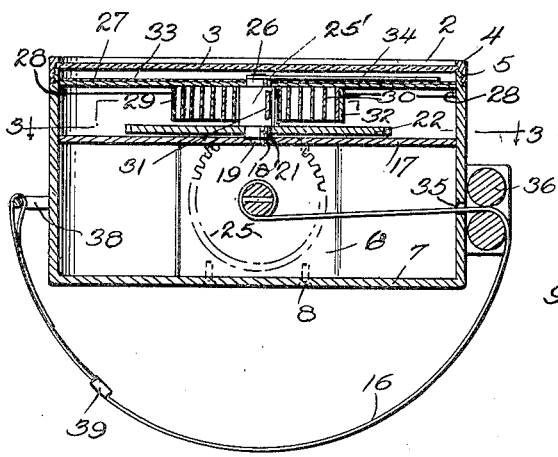
Fig. 2 is a cross section taken on a line 2—2 of Fig. 1.
Figure 4:
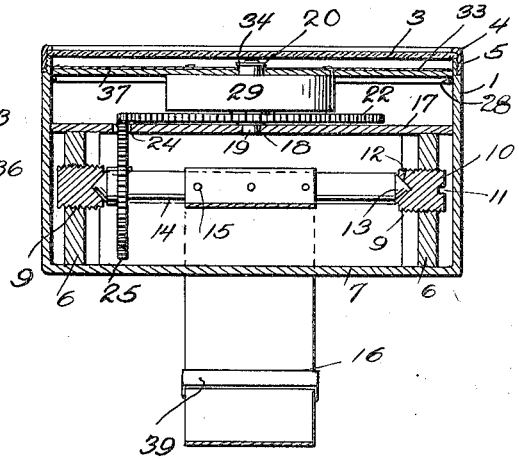
Fig. 4 is a cross section of Fig. 1 at right angles to Fig. 2.

In the illustrated embodiment characterizing this invention there is shown in the present instance, a circular casing 1 provided with a detachable closure 2 comprising a transparent face 3 suitably mounted in ring 4 threadedly engageable with casing 1 as at 5. Mounted interiorly of the casing and adjacent opposite points on the side thereof are standards 6 curved to conform to the contour of said casing and detachably secured to the bottom 7 by screws or other suitable fastening elements 8. Substantially central of their length these standards are formed with aligned threaded openings 9 adapted to receive threaded adjusting screws 10 formed in their outer ends with kerfs 11 and their inner ends with centrally disposed sockets 12 conforming in configuration to and adapted to pivotally receive the respective cone shaped or pointed ends 13 of shaft 14 mounted therein. Substantially central of its length shaft 14 is formed with spaced apertures adapted to receive either pins, thread, or other fastening means 15, by means of which an end of ribbon or strap element 16 is suitably secured to said shaft so that the same may be wound and unwound thereon, as and for a purpose hereinafter more fully appearing.

Suitably mounted on the upper ends of standards 6 is a disc frame member 17 formed at its center with opening 18 constituting a bearing for the lower reduced end 19 of arbor shaft 20 pivotally mounted therein. Adjacent said reduced end 19 is an enlarged portion 21 on which is mounted and suitably keyed or otherwise secured a gear wheel 22 adapted to mesh with gear wheel 25 mounted at right angles thereto on shaft 14 adjacent one end, keyed or otherwise suitably secured thereon and adapted to extend through slot 24 formed in disc frame member 17, as will be clear without further discussion.

Arbor shaft 20 is formed centrally with an enlarged portion 25' and adjacent thereto at its upper end with a reduced portion 26 adapted to extend through plate 27 at its center, said plate corresponding to the interior dimension of case 7 and supported by ring 28 suitably secured to the inner surface of said casing.

Suitably secured to the under surface of plate 27 is a housing 29 in which is mounted a spiral or watch spring 30 with one end suitably secured to the enlarged or hub portion 25', as at 31, and the other end to the housing as at 32 in any suitable manner, for the purpose of maintaining flexible member 16 in proper relation with the arm or affected muscle, as will hereinafter more fully appear.

Superimposed on the upper surface of plate 27 is dial face 33 of paper or any suitable material and bearing suitable graduations 33', in the present instance, including the numerals from 1 to 10. Suitably secured to the upper end of arbor shaft 20 is an indicating hand 34.

The flexible member 16 is adapted to extend through slot 35 formed in the side of casing 7 and between anti-friction rollers 36 rotatably mounted in the spaced supporting members 37 extending laterally from the side of casing 7 and secured thereto in any suitable manner. The free end of said member 16 is secured in any desired manner to loop member 38 suitably secured to the opposite side of case 7. Said flexible strap or ribbon member 16 may be provided with slip clasp 39 by means of which adjustment of said member may be effected, if desired. It is therefore apparent that by reason of said rollers and the simplified structural arrangement of parts, friction incident to the operation of the device is reduced to a minimum.

Though the operation would seem to be clear from the above description, it might be well to further state that to operatively position the device, the subject's arm is inserted through the strap or ribbon member 16 with the device supported on the arm and the strap is then adjusted by clasp 39 to lengthen or shorten the strap in accordance with the size of the arm, so that preferably the pointer 34 normally remains at zero position, and whereby the slightest muscular movement will cause corresponding actuation of shaft 14 and hand 34 on dial 33 through the instrumentality of gears 25, 22 and arbor 20, spring 30 acting to return hand 34 to its normal position or the zero point of the particular case, as will be clear without further explanation.

From the above it is apparent that I have designed a unique measuring device of the above character, with the flexible element directly controlling the gearing mechanism in one direction and the watch spring controlling it in the other, so that a delicate and accurate range of the muscular tone fluctuation is indicated, yet one simple in construction, manufacturable at a reasonable cost and efficient for the purposes intended.

While I have preferably referred to the application of the device to the forearm, it is apparent that it is not limited to such application and is susceptible of being otherwise applied according to the exigencies of the particular requirements.

Although in practice I have found that the form of my invention illustrated in the accompanying drawing and referred to in the above description as the preferred embodiment, is the most efficient and practical; yet realizing the conditions concurrent with the adoption of my invention will necessarily vary, I desire to emphasize that various minor changes in details of construction, proportion and arrangement of parts, may be resorted to within the scope of the appended claim without departing from or sacrificing any of the principles of this invention.

Having thus described my invention what I desire protected by Letters Patent is as set forth in the following claim:

A measuring device of the character described comprising a casing open at its top and having an opening in one side thereof, a gearing and indicating mechanism removably mounted in said casing and comprising a pair of spaced supports suitably mounted therein, a rotatable main shaft, means adjustably mounted in the respective supports and engageable with the ends of said shaft, a gear wheel mounted on said shaft, a pair of disc frame members suitably mounted adjacent the open end of the casing, an arbor shaft journaled in said members, a gear wheel mounted on said shaft and adapted to mesh with said first mentioned gear, a housing watch spring member having one end connected to said shaft and the other end connected to said housing, a pointer suitably secured to the free end of said arbor, a transparent closure for said casing, anti-friction rollers connected to the casing adjacent said opening, and a flexible member extending through said side opening engaging said rollers and with one end secured to said main shaft and the other end secured exteriorly of the casing, and adapted to embrace a person's arm, whereby the functional and organic muscular condition of the person is measured and indicated.

JAMES M. GRAHAM.